(12) United States Patent
Yi et al.

(10) Patent No.: US 10,769,547 B2
(45) Date of Patent: Sep. 8, 2020

(54) MOBILE SEARCHES UTILIZING A QUERY-GOAL-MISSION STRUCTURE

(71) Applicant: Yahoo!, Inc., Sunnyvale, CA (US)

(72) Inventors: Xing Yi, Milpitas, CA (US); Zhen Yue, Santa Clara, CA (US); Alyssa Glass Owara, Sunnyvale, CA (US); Zhigeng Geng, Sunnyvale, CA (US)

(73) Assignee: Oath Inc., New York, NY (US)

( * ) Notice: Subject to any disclaimer, the term of this patent is extended or adjusted under 35 U.S.C. 154(b) by 788 days.

(21) Appl. No.: 14/984,357

(22) Filed: Dec. 30, 2015

(65) Prior Publication Data

US 2017/0193057 A1 Jul. 6, 2017

(51) Int. Cl.
*G06N 20/00* (2019.01)
*G06F 16/332* (2019.01)
*G06F 16/335* (2019.01)

(52) U.S. Cl.
CPC ........... *G06N 20/00* (2019.01); *G06F 16/335* (2019.01); *G06F 16/3322* (2019.01)

(58) Field of Classification Search
CPC .. G06N 99/005; G06N 20/00; G06F 17/3064; G06F 17/30699; G06F 16/3322; G06F 16/335
See application file for complete search history.

(56) References Cited

U.S. PATENT DOCUMENTS

| | | | |
|---|---|---|---|
| 8,832,083 B1* | 9/2014 | Chen | G06F 16/951 707/723 |
| 2006/0064411 A1* | 3/2006 | Gross | G06F 16/90324 |
| 2009/0157599 A1* | 6/2009 | Klinkner | G06Q 30/02 |
| 2010/0114929 A1* | 5/2010 | Bonchi | G06F 17/3064 707/759 |
| 2011/0264665 A1* | 10/2011 | Mital | G06F 16/9535 707/741 |

(Continued)

OTHER PUBLICATIONS

Eickhoff, et al., "Lessons from the Journey: A Query Log Analysis of Within-Session Learning", Feb. 24-28, 2014, pp. 1-10.

(Continued)

*Primary Examiner* — Alford W Kindred
*Assistant Examiner* — Lin Lin M Htay
(74) *Attorney, Agent, or Firm* — Cooper Legal Group, LLC

(57) ABSTRACT

One or more client devices, systems, and/or methods of improving mobile searches are provided. A feature (e.g., "snow boots"), generated on a client device, is identified. The feature is evaluated to identify a goal (e.g., finding snow boots) associated with the feature. A mission (e.g., finding outdoor apparel), associated with the goal, is identified. A query (e.g., "outdoor stores near Akron") associated with a second goal (e.g., find outdoor apparel store) associated with the mission is identified using a model generated utilizing a machine learning method trained using a query-goal-mission structure. A query recommendation (e.g., "outdoor apparel store") comprising the query is presented to the user. A user satisfaction metric, associated with the query, the query recommendation, a result generated by the query recommendation, etc. is determined based upon user interaction with the query recommendation and the result. The model may be tuned based upon the user satisfaction metric.

20 Claims, 13 Drawing Sheets

(56) References Cited

U.S. PATENT DOCUMENTS

| | | |
|---|---|---|
| 2011/0295776 A1 | 12/2011 | Donato et al. |
| 2012/0117070 A1* | 5/2012 | Hiltz-Laforge ....... G06F 16/335 707/740 |
| 2012/0150854 A1* | 6/2012 | Song ................. G06F 17/30882 707/728 |
| 2012/0173513 A1* | 7/2012 | Agrawal ........... G06F 17/30448 707/716 |
| 2013/0110863 A1* | 5/2013 | Lai .................... G06F 17/30867 707/767 |
| 2013/0132433 A1* | 5/2013 | Ozertem ........... G06F 17/30864 707/771 |
| 2013/0238762 A1* | 9/2013 | Raleigh ................. H04L 67/306 709/219 |
| 2014/0280952 A1* | 9/2014 | Shear ...................... H04L 47/70 709/226 |

OTHER PUBLICATIONS

Feild, et al., "Task-Aware Query Recommendation", Jul. 28-Aug. 1, 2013, pp. 1-10.
Jiang, et al., "PITT at TREC 2011 Session Track", Nov. 2011, http://d-scholarship.pitt.edu/12468/, pp. 1-5.
Jones, et al., "Beyond the Session Timeout: Automatic Hierarchical Segmentation of Search Topics in Query Logs", Oct. 26-30, 2008, pp. 1-10.
Kanoulas, et al., "Overview of the TREC 2011 Session Track", Nov. 15-18, 2011, http://repository.edgehill.ac.uk/5733/, pp. 1-29.
Lucchese, et al., "Discovering Tasks from Search Engine Query Logs", Jul. 2013, ACM Transactions on Information Systems, vol. 31, No. 3, Article 14, pp. 1-43.
Lucchese, et al., Identifying Task-based Sessions in Search Engine Query Logs, Feb. 9-12, 2011, pp. 277-286.
Montanez, et al., "Cross-Device Search", Nov. 3-7, 2014, pp. 1-10.
Bushee, et al., "SIRA: TREC Session Track 2014", http://trec.nist.gov/pubs/trec23/papers/pro-SCIAITeam_session.pdf, 2014, pp. 1-7.
Kanoulas, et al., "Evaluating Multi-Query Sessions", Jul. 24-28, 2011, pp. 1-10.
Hassan, et al., "Beyond Clicks: Query Reformulation as a Predictor of Search Satisfaction", Oct. 27-Nov. 1, 2013, pp. 2019-2028.
Li, et al., "Good Abandonment in Mobile and PC Internet Search", http://static.googleusercontent.com/media/research.google.com/en//pubs/archive/35486.pdf, Jul. 19-23, 2009, pp. 1-8.

* cited by examiner

MOBILE SEARCHES UTILIZING A QUERY-GOAL-MISSION STRUCTURE

BACKGROUND

Users may utilize search engines to perform search tasks and/or view recommendations generated for the user based upon the search tasks. In an example, a user may perform one or more searches by generating queries (e.g., "WWII books," "World War II book review," and/or other queries) to achieve a goal (e.g., a goal to find a book about World War II). The search engines may attempt to assist the users with the search tasks by utilizing search logs containing previous queries of the user (e.g., a query level and/or a course session level approach). For example, the search engine may utilize the search logs generated during a search session (e.g., searches performed by the user within a time period) to assist the users with a search (e.g., by identifying search results, ranking search results, generating query recommendations, etc). Unfortunately, the query level and/or the course session level approach may have limited accuracy in predicting the user's desires, especially over extended periods of time (e.g., weeks, months, years, etc). Satisfaction metrics (e.g., related to a search relevance of results and/or search performance evaluations) associated with search results generated utilizing the query level and/or the course session level approach may be correspondingly low based upon the limited accuracy. The user may be engaged in a complex search (e.g., planning a vacation involving finding hotels, car rentals, air flights, activities, etc.). For example, the user may generate multiple related queries interspersed with random queries (e.g., the user may multi-task). In an example, the multiple related queries may be associated with researching new refrigerators (e.g., "types of refrigerators," "refrigerator sellers," "warranties," and/or other queries related to refrigerators). The queries related to refrigerators may be interspersed with the random queries (e.g., "what is the weather like today," "football scores," etc.).

The random queries may create ambiguity when used to identify a search task. The ambiguity may result in incorrect queries being associated with the search task. Thus, users may be provided with irrelevant query recommendations, unwanted search results, and/or be required to perform multiple searches to obtain desired search results. Unfortunately, because many computing devices, systems, etc., may not have an ability to parse related queries from random queries, user satisfaction metrics based upon an accuracy of identifying related queries may not be determined.

SUMMARY

In accordance with the present disclosure, one or more client devices, systems, and/or methods for improving mobile searching are provided. In an example, a feature (e.g., a user interaction with the client device), generated by a user within a time period (e.g., a weekend), may be identified based upon an identification of the user. In an example, the user interaction may comprise a telephone call (e.g., to a camping store), an initial query (e.g., "where can I buy a tent"), a webpage interaction (e.g., viewing tents), and/or a textual interaction (e.g., texting the camping store, emailing a friend about camping, or a social network post about tent recommendation). The feature may be tagged with a goal identification comprising a goal history of the user and/or a mission identification comprising a mission history of the user (e.g., in a query-goal-mission structure). The feature may be evaluated, utilizing the goal identification and/or mission identification, to identify a goal associated with the feature (e.g., finding a tent). A user satisfaction metric, associated with the goal, may be calculated to determine a goal satisfaction metric. The goal satisfaction metric may be based upon user interaction with results associated with the goal. The results may be generated by a first model generated utilizing a machine learning method based upon a query-goal-mission structure. A second user satisfaction metric associated with the goal may be calculated to determine a second goal satisfaction metric. The second goal satisfaction metric may be based upon second user interaction with second results associated with the goal. The second results may be generated by a second model generated utilizing the machine learning method based upon the query-goal-mission structure. A mission, associated with the goal, may be identified (e.g., going on a camping trip). The user satisfaction metric associated with the mission may be calculated to determine a mission satisfaction metric. The mission satisfaction metric may be based upon user interaction with results associated with the mission. The results may be generated by the first model. The second user satisfaction metric associated with the mission may be calculated to determine a second mission satisfaction metric. The second mission satisfaction metric may be based upon second user interaction with second results associated with the mission, the second results generated by the second model A second goal (e.g., finding a camping location), associated with the mission, may be identified. A query (e.g., "Moneta Camping Ground") associated the second goal may be identified. The query may have a weighted common goal similarity (e.g., a similarity of attributes of the feature and the query) within a goal similarity range of the feature. The weighted common goal similarity may be based upon the time period (e.g., a weekend, a morning, an evening, a weekday, etc.), a location of the user, etc.

A query recommendation may be presented to the user. The query recommendation may be generated utilizing a query recommendation model. The query recommendation model may be generated utilizing the machine learning method trained using the query-goal-mission structure. A second query recommendation may be presented to the user. The second query recommendation may be determined utilizing a second query recommendation model (e.g., generated utilizing the machine learning method trained using the query-goal-mission structure).

A first result, of the query and/or the query recommendation, presented to the user, may be evaluated (e.g., based upon the goal, the second goal, and/or mission). An element ranking of the first result may be determined utilizing a search result ranking model. The search result ranking model may be generated utilizing the machine learning method trained using the query-goal-mission structure. A second element ranking of a second result presented to the user may be evaluated. The second element ranking may be determined utilizing a second search result ranking model (e.g., generated utilizing the machine learning method trained using the query-goal-mission structure). A user interaction of the user with the first result, the second result, the query recommendation, and/or the second query recommendation (e.g., selecting an element of the result and/or the second result, scrolling through the result and/or second result, selecting the query recommendation and/or the second query recommendation, performing a new search, etc.) may be evaluated to create a result user satisfaction metric and/or a query recommendation user satisfaction metric. In an example, the user satisfaction metric, the result user satisfaction metric, and/or a query recommendation user satisfaction metric may be determined utilizing a goal based or a mission based abandonment rate, a goal based or a mission based reformulation rate, a number of queries generated by the user associated with at least one of the goal or mission, a number of clicks initiated by the user associated with at least one of the goal or mission, a total time utilized by the user generating queries associated with at least one of the goal or mission and viewing results of the queries, a normalized discounted accumulated gain for the goal, the second goal, the mission, the first result, and/or the second result, a discounted accumulated gain for the goal, the second goal, the mission, the first result, and/or the second result, a mean-average precision for the goal, the second goal, the mission, the first result, and/or the second result, a mean reciprocal rank for the goal, the second goal, the mission, the first result, and/or the second result, etc. The user satisfaction metric may be calculated based upon the user interaction (e.g., with the feature tagged with the goal and/or mission, the first result, the second result, the query result, the second query result, etc).

In an example, a reformulation may be identified to calculate the reformulation rate. The reformulation may be identified by determining that the query and a second query generated by the user comprise a same goal and/or same mission (e.g., as designated the query-goal-mission structure), that the query and the second query are not a last query having the same goal and/or same mission in a query set, and that the query and the second query have Jaccard similarity greater than a threshold (e.g., about 0.3 or any other threshold value). In an example, an abandonment may be identified to calculate the abandonment rate. The abandonment may be identified by determining that the query having the goal is a last query in the mission and/or the last query in a query set having the goal, identifying the query as not being a reformulation (e.g., a reformulation of a different query), and determining that the user did not have a user interaction with the result of the query.

In another example, the user satisfaction metric for the goal, the second goal, and/or the mission may be based upon a swipe rate through card modules having the goal, the second goal, and/or the mission (e.g., comprising recommendations, results, etc. generated based upon the goal, mission, and/or second goal), a number of card modules viewed having the goal, the second goal, and/or the mission, a card dismissal rate of the card modules having the goal, the second goal, and/or the mission, number of card modules touched having the goal, the second goal, and/or the mission, a time the user views a card module having the goal, the second goal, and/or the mission, an average scroll rate through the card modules having the goal, the second goal, and/or the mission, etc.

In an example, responsive to the user satisfaction metric exceeding the second user satisfaction metric, the first model, but not the second model may be designated for subsequent use for presenting results to users. In an example, responsive to the user satisfaction metric associated with the query recommendation (e.g., a query recommendation user satisfaction metric) exceeding the second user satisfaction metric associated with the second query recommendation (e.g., a second query recommendation satisfaction metric), the query recommendation model, but not the second query recommendation model may be designated for subsequent use for presenting query recommendations to users. In another example, responsive to the user satisfaction metric associated with the first result (e.g., a result user satisfaction metric) exceeding a second user satisfaction metric associated with the second result (e.g., a second result user satisfaction metric), the search result ranking model, but not the second search result ranking model may be designated for subsequent use for presenting results to users. In an example, the first model, the search result ranking model, and/or the query recommendation model may be tuned and/or trained based upon a corresponding user satisfaction metric.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
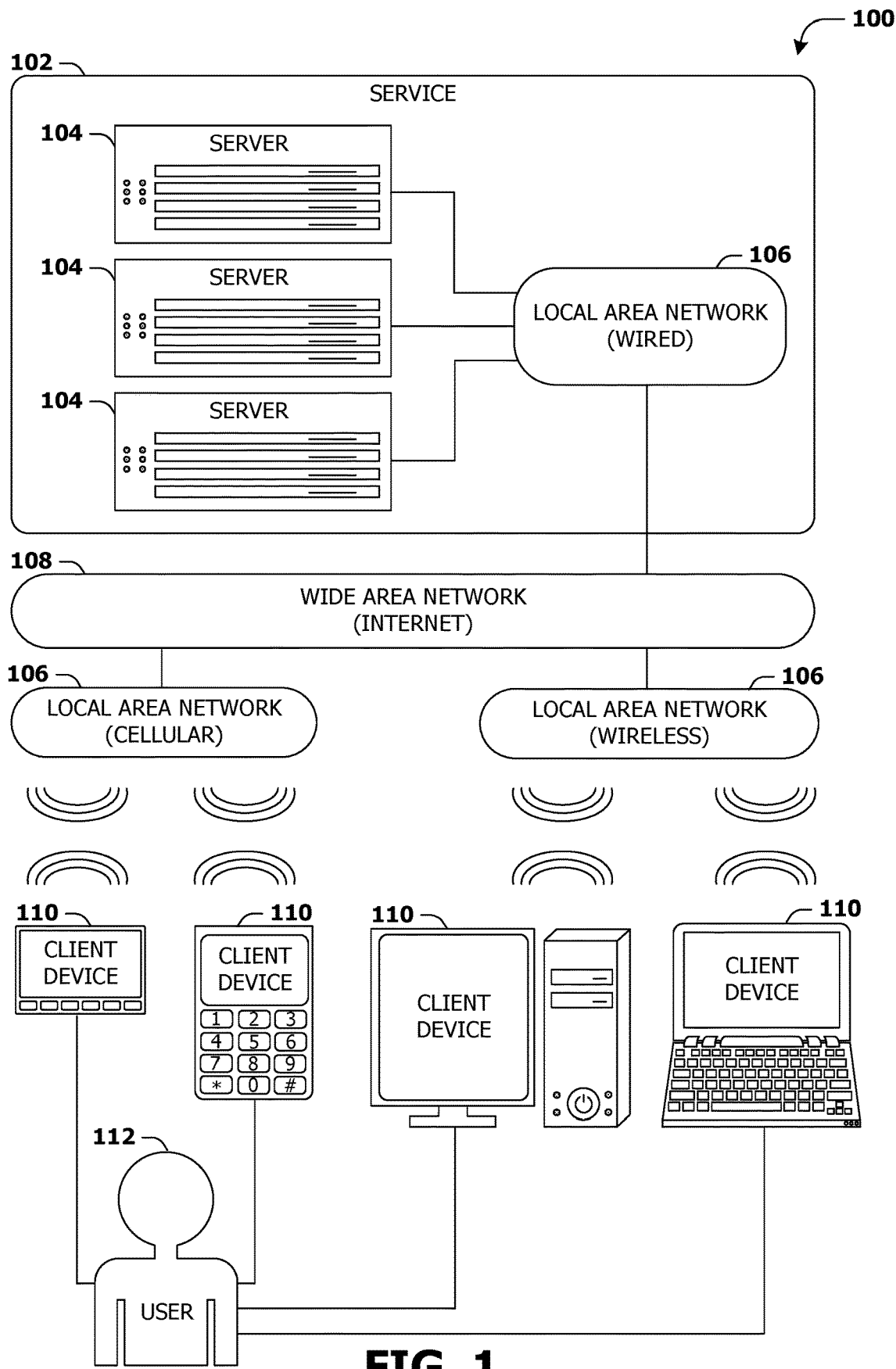
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
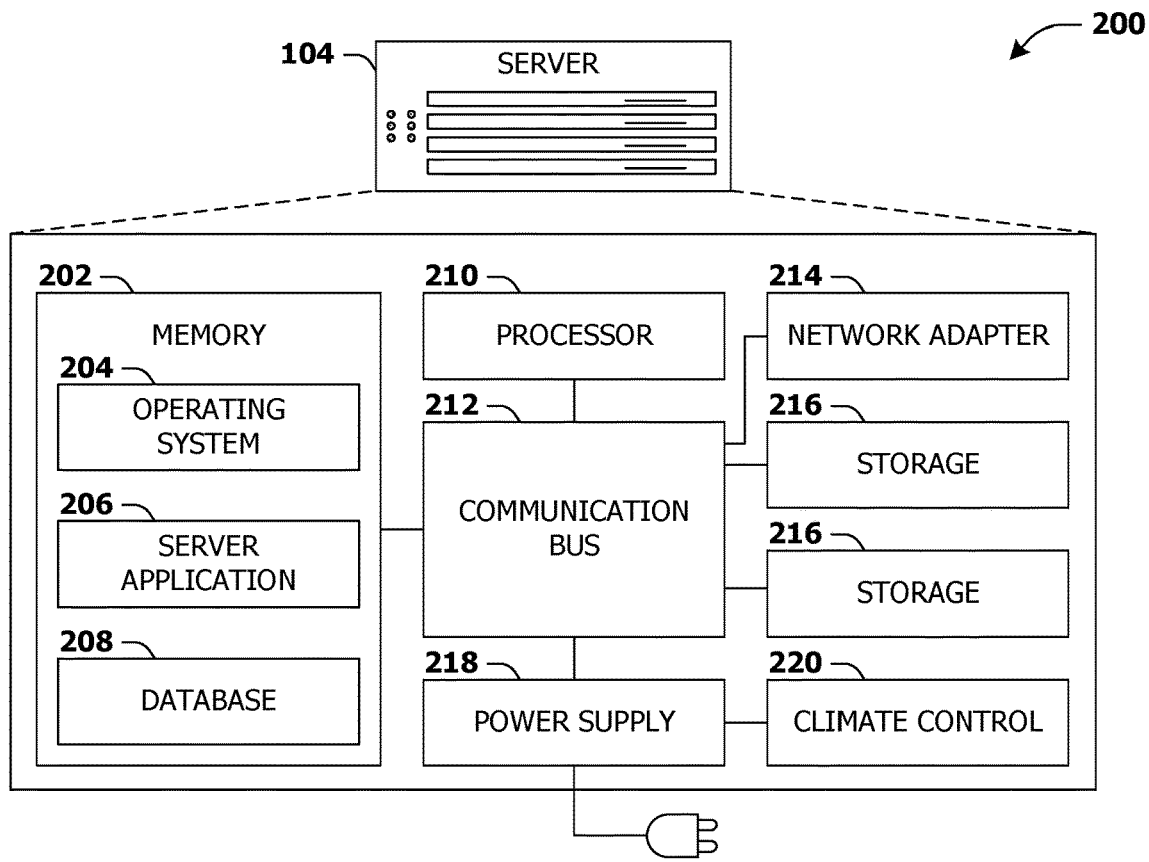
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
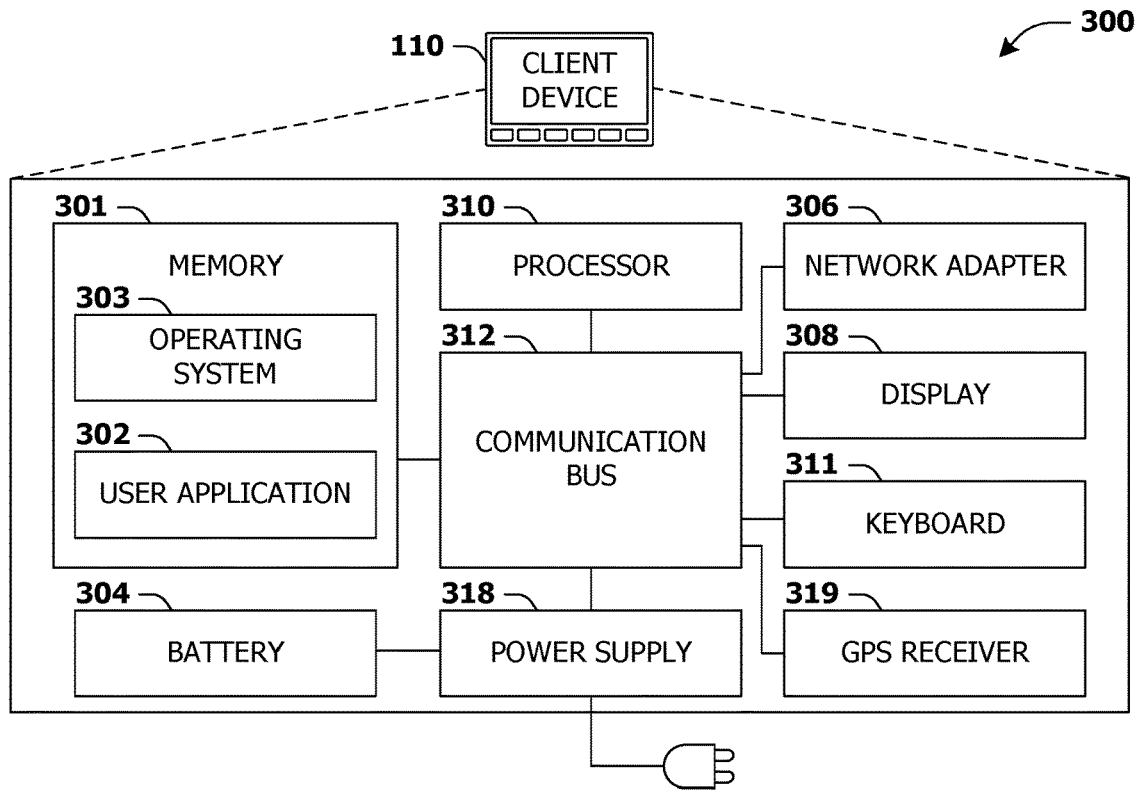
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more client devices, systems, and/or techniques for improving mobile searches are provided. Many search engines may lack a capability to evaluate features (e.g., user interactions with the one or more client devices), generated by a user over multiple sessions, based upon goals and/or missions associated with the features. In an example, a goal may comprise a desired outcome of a task (e.g., finding a pair of shoes, identifying an interesting book to read, etc.). A mission may comprise a set of goals having a common theme. For example, a mission, corresponding to planning a night out, may have a first goal of buying movie tickets, a second goal of finding a restaurant near a movie theater, a third goal of making reservations at the restaurant, etc. In an example, a feature may comprise a telephone call (e.g., a call to a restaurant), an initial query (e.g., "restaurants near me"), a webpage interaction (e.g., viewing restaurants), and/or textual interaction (e.g., texting the restaurant, a social network post about good movies to see, an email about a restaurant, etc.).

The user may generate the feature (e.g., by calling Joe's restaurant) on a client device. The goal (e.g., finding a restaurant) of the feature may be identified (e.g., sorted into a goal classification) based upon attributes of the feature (e.g., keywords in the initial query, a caller identification of an outgoing/incoming telephone call and/or textual message, the time period in which the feature was generated, a webpage that the user views, a length of time the user views a particular webpage, a location of the user when the feature was generated, etc.). The feature may be tagged with goal identifications associated with historical goals of the user (e.g., such as generated in a query-goal-mission structure), and/or mission identifications associated with historical missions of the user (e.g., such as generated in the query-goal-mission structure).

A mission (e.g., planning a date night), from the query-goal-mission structure and associated with the goal, may be identified. A second goal (e.g., making reservations at Joe's restaurant), associated with the mission, may be identified (e.g., based upon a historical user satisfaction metric associated with the goal, the second goal, and/or the mission). A query, (e.g., "how do I make reservations at Joe's restaurant") associated with the second goal, may be identified by a first model utilizing by a machine learning method trained using the query-goal-mission structure. A query recommendation, identified by a query recommendation model utilizing the machine learning method trained using the query-goal-mission structure, comprising the query, may be presented to the user.

A result, of the query, comprising an element corresponding to a webpage for making a reservation at Joe's restaurant, may be presented to the user. A recommendation, comprising the webpage for making the reservation at Joe's restaurant, may be presented to the user. The user may interact with the result, the recommendation, and/or query recommendation (e.g., selecting the recommendation, scrolling through elements of the result, selecting an element from the result, leaving a page comprising the result, etc.). A user satisfaction metric may be calculated based upon the user interaction. The user satisfaction metric (e.g., an efficacy of a goal and/or mission identification) may be based upon an abandonment rate (e.g., how often the user abandons a mission and/or goal without interacting with the result and/or query recommendation), and/or a reformulation rate (e.g., how often the user reformulates queries, having a same goal and/or mission, to find the desired result). The user satisfaction metric may be based upon a mean reciprocal rank (MRR) (e.g., a statistical measure of a process that produces a list of results), a normalized and/or discounted accumulated gain (DAG) (e.g., a graded relevance value of elements of a result), and/or mean average precision (MAP) (e.g., a standard single number measure for comparing search algorithms). In an example, the user satisfaction metric may decrease based upon an increase in the abandonment rate and/or the reformulation rate. In an example, the user satisfaction metric may decrease based upon the MRR, the DAG, the normalized DAG, and/or the MAP being below a threshold.

In an example, the first model, the search result ranking model, and/or query recommendation model may be selected (e.g., from several models, search result ranking models, and/or query recommendation models) based upon a model having a highest and/or relatively high user satisfaction metric (e.g., as related to the goal and/or mission). In an example, the user satisfaction metric may be determined for the goal and/or for the mission.

The user satisfaction metric for the goal and/or mission may be a more accurate metric for improving and/or selecting a model, a search result ranking model, and/or a query recommendation model to improve long-term user engagement. A goal based user satisfaction metric may be more accurate for selecting models for engaging user's long term engagement as compared to a model selected based upon a query or session based user satisfaction metric. In an example, the first model, the search result ranking model, and/or query recommendation model may be tuned (e.g., altered) based upon the user satisfaction metric. In another example, query level metrics (e.g., reformulation rates, abandonment rates, etc.) may be improved based upon the query-goal-mission structure.

The user's experience may be improved because relevant content, query recommendations, and/or other recommendations may be provided to the user based upon the query-goal-mission structure (e.g., the query-goal-mission structure may be improved by evaluating features within the query-goal-mission structure to adapt to changes of the user over time). Additionally, the user's experience may be improved based upon models being tuned and/or selected based upon the user satisfaction metric.

Additionally, by utilizing the query-goal-mission structure having been improved by identifying goal classifications and/or mission classifications that are not valid for the user, a user experience may be improved because irrelevant content, which may otherwise have been provided to the user as a result of taking into account user query multitasking, may not be provided to the user. In an example, an operating efficiency of the user and/or a search engine may be improved by generating and/or utilizing an improved query-goal-mission structure. For example, the user may more efficiently locate relevant results by utilizing the improved query-goal-mission structure to provide improved results, ranking of elements of the results, query recommendations, and/or recommendations, which may mitigate wasted computing resources and time otherwise spent attempting to locate relevant content (e.g., reduce search engine usage traffic that results from additional searches being performed). In this way, the improved query-goal-mission structure may be utilized to efficiently guide the user to answers by evaluating features from previous user sessions and providing the user with query recommendations, results, recommendations, etc. tailored to accurate and relevant goals and/or missions of the user. Accordingly, computing resources may be reduced, user efficiency for accomplishing a search may be improved, and a user satisfaction may be improved.

Figure 4:
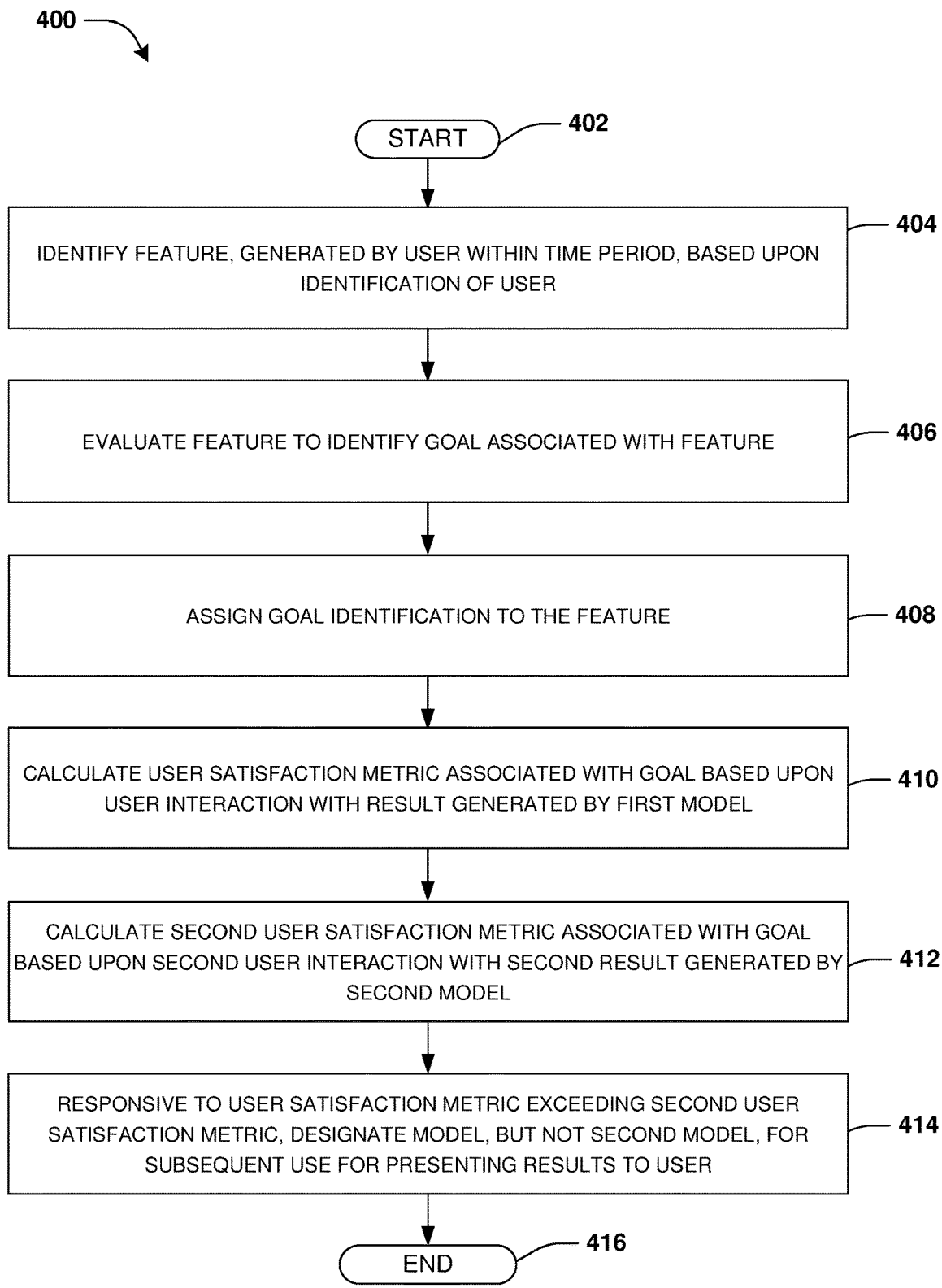
FIG. 4 is a flow chart illustrating an example method for improving mobile searching.

An embodiment of improving mobile searching is illustrated by an example method 400 of FIG. 4. At 402, the method 400 starts. At 404, a feature (e.g., an initial query, a telephone call, a text message, a webpage interaction, a social network post, an email, etc.) generated by a user, of a client device, may be identified based upon an identification of the user. In an example, the feature may comprise a webpage interaction with a ticket selling website to view a local football game ticket. The identification of the user may be based upon an identity assigned to the client device, a login of the user with an application on the client device, etc. The feature may be tagged with a goal identification, comprising a goal history of the user, and/or a mission identification comprising a mission history of the user (e.g., such as in a query-goal-mission structure).

At 406, the feature may be evaluated to identify a goal associated with the feature (e.g., such as online or offline). A first model, utilizing a machine learning method, trained utilizing the query-goal-mission structure, may identify the goal. A goal classifier may be utilized to evaluate possible combinations of the feature with one or more goal clusters (e.g., clusters of related queries having a same or similar goal). For example, the feature (e.g., viewing football tickets) and a first potential query (e.g., "buy basketball tickets"), from a first potential goal cluster, may be evaluated as a feature-first-potential-query pair (e.g., viewing football tickets: buy basketball tickets) to determine a first common goal similarity for the feature-first-potential-query pair corresponding to the goal. In another example, the feature (e.g., viewing football tickets) and a second potential query (e.g., buy football tickets) may be evaluated as a feature-second-potential-query pair (e.g., viewing football tickets: buy football tickets) to determine a second common goal similarity indicative of the feature-second-potential-query-pair corresponding to the goal.

In an example, a common goal similarity may be calculated (e.g., by the first model) for each possible feature-potential-query combination (e.g., the feature and one or more potential queries). The common goal similarity may be indicative of a probability of the feature having a same goal as a potential query (e.g., an indication of a similarity between the feature and the potential query and/or a potential goal cluster). In an example, the goal classifier may identify aspects of the feature and/or potential queries. The aspects may relate to different components of the feature and/or potential queries, such as a total number of queries in a set of queries in which the potential queries were generated, a number of search results retrieved responsive to a potential query, the period of time in-between submissions of the potential queries, a time period in which the feature was generated relative to the potential queries, etc.

In an example, each term in a particular potential query and/or feature may be utilized as an input for computing aspect values for the feature and the potential queries. In an example, the aspects may comprise local aspects (e.g., Jaccard similarity of a term from the feature and a term from a potential query, normalized Levenshtein edit distance, a time interval, position difference, conxsim, etc.), global aspects (e.g., log-likelihood ratio for the feature and the potential query, entropy, the entropy of rewrite probabilities from potential queries/features which can be rewritten, pointwise mutual information, pq12, such as a normalized probability that the feature is rewritten as the potential query aggregated over many user sessions, etc.), global term aspects (e.g., term-pointwise mutual information, t-pq12, etc.), and/or desktop term aspects (e.g., the same as the global term aspects but using desktop search logs).

The global term aspects and the global aspects may be computed utilizing cross-session statistics. In an example, the local aspect may comprise a conxsim feature. The conxsim feature may utilize contextual information and an exponential decay parameter to determine an association between the feature and adjacent potential queries and/or potential query terms (e.g., direct associations between the feature and adjacent potential queries). In an example, the goal classifier may utilize linear models with Akaike Information Criterion (AIC) to select the aspects utilized to determine the common goal probabilities. For example, the goal classifier may select a first set of aspects, from the feature and the first potential query, to determine the common goal similarity for the feature and the first potential query. Thus, the first set of aspects may be optimized to determine the common goal probabilities based upon aspects of the feature and the first potential query. In an example, the goal classifier may select a first aspect, but not a second aspect, based upon query information associated with the potential queries (e.g., a query length, a query date, a device ID, query tail features, etc.) for the potential queries within the set of potential queries. A goal cluster, comprising the potential query having a highest common goal similarity relative to the feature, may be identified. The goal associated with the goal cluster may be identified as the goal of the feature. In this way, the goal of the feature may be more accurately identified as a result of the feature being more effectively grouped into the goal cluster. In another example, the common goal similarity may be weighted to generate a weighted common goal probability. The weighted goal similarity may be based upon a time that the user generated the feature, a location of the user when the user generated the feature, a current location of the user, etc. For example, a different goal may be assigned to the feature based upon a proximity of the user to a football stadium, or based upon the user's preferred searching preferences for a time of day, a season, etc.

In an example, a mission, associated with the goal, may be identified (e.g., by the first model). The goal cluster may be associated with a mission and/or a mission cluster. The mission may be identified as the mission of the feature. For example, the mission may comprise going to a football game, which would encompass goals such as viewing football tickets (e.g., the goal of the feature of viewing football tickets through a ticket selling website), buying football tickets, finding parking near the football game, finding transportation to the football game, buying appropriate sports apparel, etc. A query, associated with the goal and/or the mission may be identified by the first model. In an example, a result of the query may be presented to the user. The result may comprise one or more elements corresponding to websites, applications, and/or other content (e.g., links to websites or a ticket purchasing app where the user may purchase football tickets).

At 408, a goal identification may be assigned to the feature (e.g., by the first model). The goal identification may identify the goal associated with the feature. In an example, a mission identification be assigned to the feature (e.g., by the first model). The mission identification may identify the mission associated with the feature.

At 410, a user satisfaction metric, associated with the goal, may be calculated based upon user interaction with the result (e.g., identified by the first model). In an example, the user satisfaction metric may be determined for the goal to generate a goal satisfaction metric. In an example, the user satisfaction metric may be determined for the mission to generate a mission satisfaction metric. In an example, the user satisfaction metric may be calculated utilizing a goal based or a mission based abandonment rate, a goal based or a mission based reformulation rate, a number of queries generated by the user having the goal and/or the mission, a number of clicks associated with the goal and/or the mission initiated by the user, a total time utilized by the user generating queries having the goal and/or the mission and viewing results of the queries, a normalized and/or discounted accumulated gain for the goal and/or the mission, a mean-average precision for the goal and/or the mission, a mean reciprocal rank for the goal and/or the mission, etc. The reformulation rate may be determined based upon identifying a reformulation. The reformulation may be identified based upon a reformulation query being identified, a second reformulation query having a same goal and/or mission as the first reformulation query being identified, the reformulation query and the second reformulation query not comprising a last query in a query set having the same goal and/or a last query in a mission, and/or the reformulation query and the second reformulation query having a Jaccard similarity greater than a threshold (e.g., about 0.3 or any other threshold value).

The abandonment rate may be identified based upon identifying an abandonment. The abandonment may be identified based upon identifying an abandonment query, having the goal, as a last query in the query set having the same goal and/or mission, identifying the abandonment query as not being a reformulation, and/or determining that the user did not have a user interaction with a result of the abandonment query. The user satisfaction metric may be based upon an average click rank position for the goal and/or the mission. In another example, the user satisfaction metric may be based upon a swipe rate through card modules (e.g., comprising recommendations, results, etc. generated based upon the goal and/or mission), a number of card modules viewed associated with the goal and/or the mission, a card dismissal rate of the card modules associated with the goal and/or the mission, a number of card modules touched associated with the goal and/or the mission, a time the user views a card module associated with the goal and/or the mission, an average scroll rate through the card modules associated with the goal and/or the mission, etc.

The user satisfaction metric may be based upon the abandonment rate, the reformulation rate, the MAP, the DAG, the normalized DAG, and/or the MRR associated with the result. In an example, a relatively higher abandonment rate and/or reformulation rate may be indicative of a lower user satisfaction metric. In an example, a relatively lower MAP, DAG, Normalized DAG, and/or MRR may be indicative of a lower user satisfaction metric.

goal similarity goal similarity At 412, a second user satisfaction metric, associated with the goal, may be calculated based upon a second user interaction with a second result (e.g., identified by a second model trained utilizing the machine learning method based upon the query-goal-mission structure). In an example, the second model may identify a different goal as being associated with the feature and/or a different mission as being associated with the goal. The second result may be presented to the user. The second result may comprise one or more ranked elements. The second user satisfaction metric may be calculated in the same manner as described above with regards to the user satisfaction metric. At 414, responsive to the user satisfaction metric exceeding the second user satisfaction metric, the first model, but not the second model, may be designated for subsequent use for presenting results to users. In another example, responsive to the second user satisfaction metric exceeding the user satisfaction metric, the second model, but not the first model, may be designated for subsequent use for presenting results to users. At 416, the method 400 ends.

FIGS. 5A-5F illustrate an example system 500 for improving mobile searching utilizing a mobile search component 510. A user, of a client device 110, may generate a feature 511. The feature 511 may comprise an initial query 508, entered into a query field 506 on a search webpage 504, a phone call 503, a text message 505, and/or viewing or selecting elements on a webpage 507 (e.g., a social network website). The mobile search component 510 may tag the feature 511 with a goal identification 512 comprising a goal history of the user (e.g., stored in a query-goal-mission structure) and/or a mission identification 513 comprising a mission history of the user (e.g., stored in the query-goal-mission structure). As described above with regard to the method 400, a goal (e.g., and a goal cluster comprising the goal) of the feature 511 (e.g., a phone call to an upscale restaurant) may be identified (e.g., the feature 511 may be identified from a historical record of past searches by the user). A mission (e.g., planning a date night) comprising the goal cluster may be identified, and a second goal, (e.g., finding a theater near the upscale restaurant) from a second goal cluster associated with the mission, may be identified. A query 515, having a weighted common goal similarity within a goal similarity range of the feature 511, may be identified.

In an example, the query 515, identified by the first model, from a second goal cluster may be identified. The query 515 may be associated with a second goal (e.g., from the second goal cluster of the mission). The second goal may be associated with the mission and have a goal similarity within a similarity range of the goal. The second goal may be identified based upon the second goal cluster having a similar goal to the goal. The query 515 may have a weighted common goal similarity within a goal similarity range of the feature 511. The weighted common goal similarity may be determined in a same or similar manner as described above with regards to the common goal probability. In an example, responsive to the second goal cluster not comprising the query having the weighted common goal similarity within the goal similarity range (e.g., the query is not sufficiently associated with the feature on a goal and/or a mission level), a third goal cluster, having a next closest goal similarity, may be identified. A second query from the third goal cluster may be identified. Multiple iterations of goal cluster selection followed by query identification may be completed until a sufficient query is identified.

Additionally, the weighted common goal similarity may be weighted by the time period in which the feature 511, queries within the goal cluster, and/or queries within the second goal cluster were generated. In an example, the user may have tasks that are time period oriented. The user may prefer to view weather conditions in a pre-work time period (e.g., around 7 a.m.), at lunch places near the user's office around a lunch time period (e.g., 11:30-1:00), at entertainment venues in a post-work time period, etc. In an example, if the feature 511 comprising viewing football tickets was generated in the pre-work period, then the second goal may comprise identifying a weather condition for a place and time of the football game. In another example, if the feature of viewing football tickets was generated in the post-work period, then the second goal may comprise identifying parking lot near the stadium in which the football game may be played. A query recommendation 514 (e.g., comprising a link to the parking lot near the stadium), comprising the query 515, identified by a query recommendation model 509, may be presented to the user.

Figure 5A:
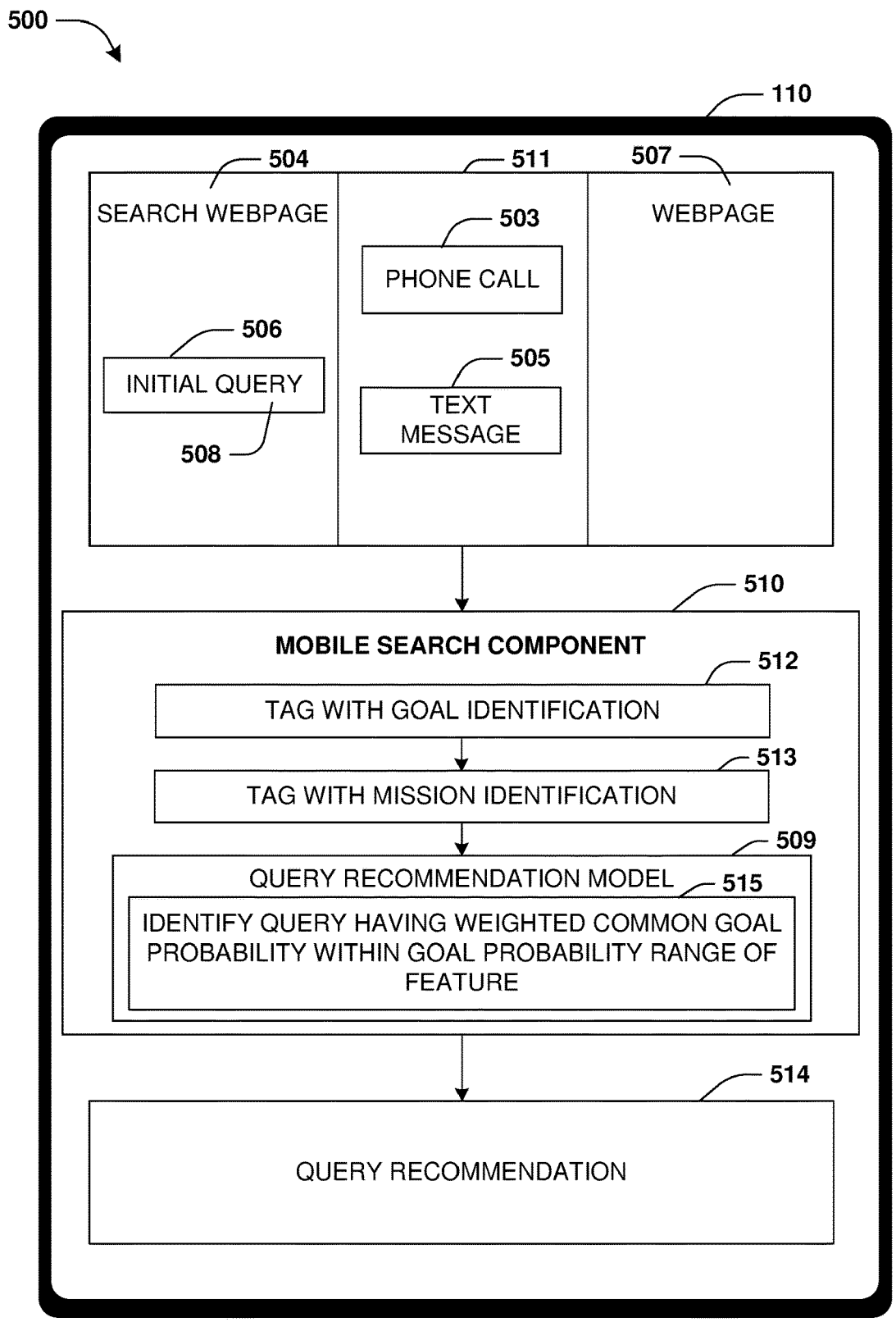
FIG. 5A is a component block diagram illustrating an example system for improving mobile searching, where a query recommendation is generated.
Figure 5B:
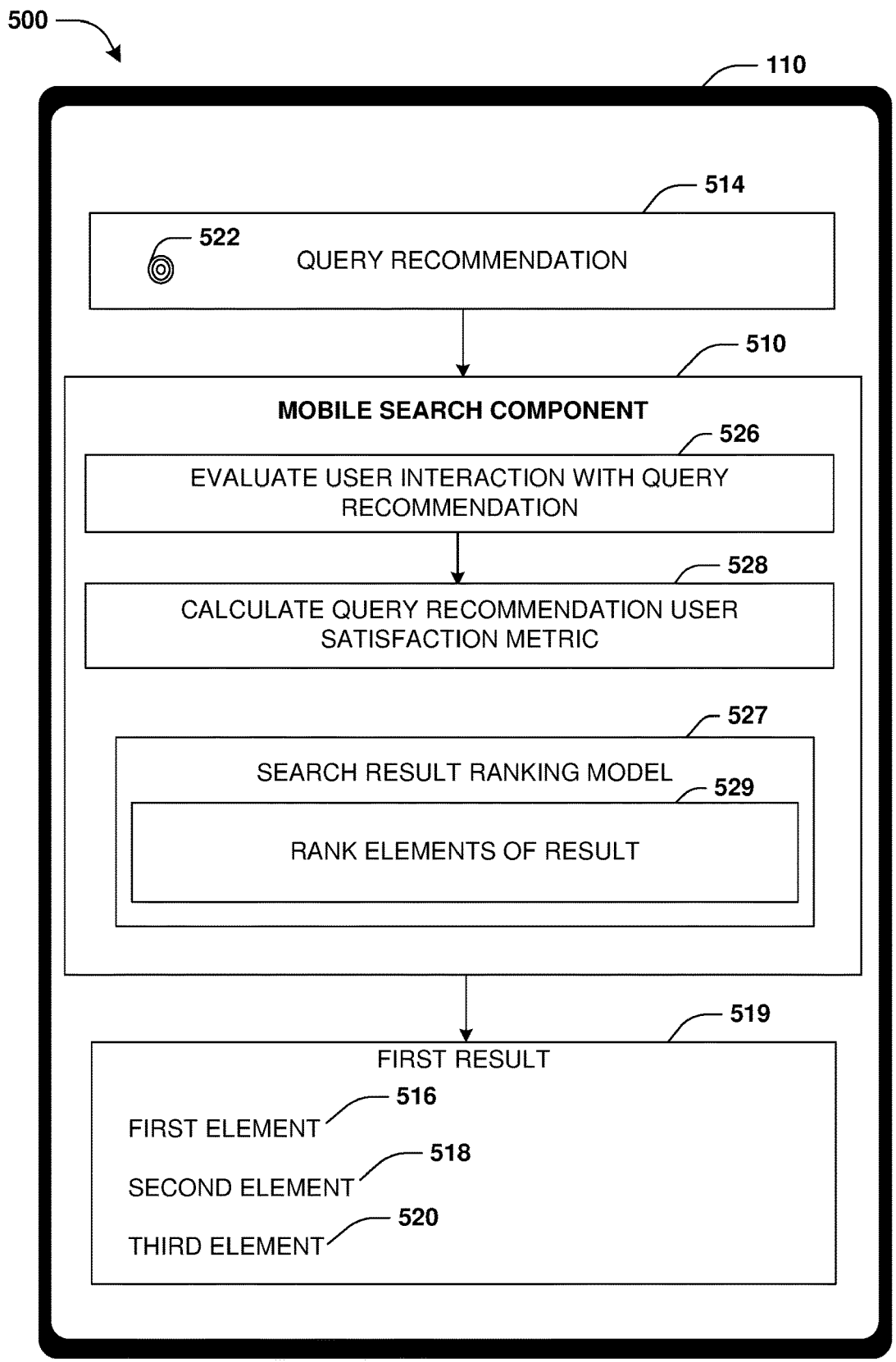
FIG. 5B is a component block diagram illustrating an example system for improving mobile searching, where a first result is generated.

FIG. 5B illustrates the user selecting 522 the query recommendation 514. Responsive to the user selecting 522 the query recommendation 514, a user interaction with the query recommendation 514 may be evaluated. A query recommendation user satisfaction metric 528 may be calculated based upon the user interaction. In another example, the query recommendation user satisfaction metric 528 may be determined based upon the user interaction with the query recommendation 514. The query recommendation user satisfaction metric 528 may be utilized to the tune the query recommendation model 509 (e.g., online or offline).

A search result ranking model 527 may rank elements of a first result 519, corresponding to the query recommendation 514 and/or the initial query 506. The first result 519 may be presented to the user. The first result 519 may comprise a first element 516 (e.g., a link to a movie ticket purchasing website), a second element 518 (e.g., a link to the theater), a third element 520 (e.g., a link to a second movie ticket purchasing website), etc. In another example, the user may be presented with a recommendation (not shown) (e.g., event recommendations, activity recommendations, business recommendations, social media recommendations, etc.) based upon the initial query 506 (e.g., "buy these football tickets from this vendor"). The recommendation may be generated by a recommendation model. In another example, the recommendation and/or query recommendation may be generated based upon a search history (e.g., using previous features generated by the user in a same manner as described above with regard to the feature) of the user, and may be presented to the user absent the user generating the feature. In another example, the user satisfaction metric may comprise a recommendation user satisfaction metric determined based upon the user interaction with the recommendation generated based upon the query 515. The recommendation user satisfaction metric may be utilized to the tune the recommendation model.

Figure 5C:
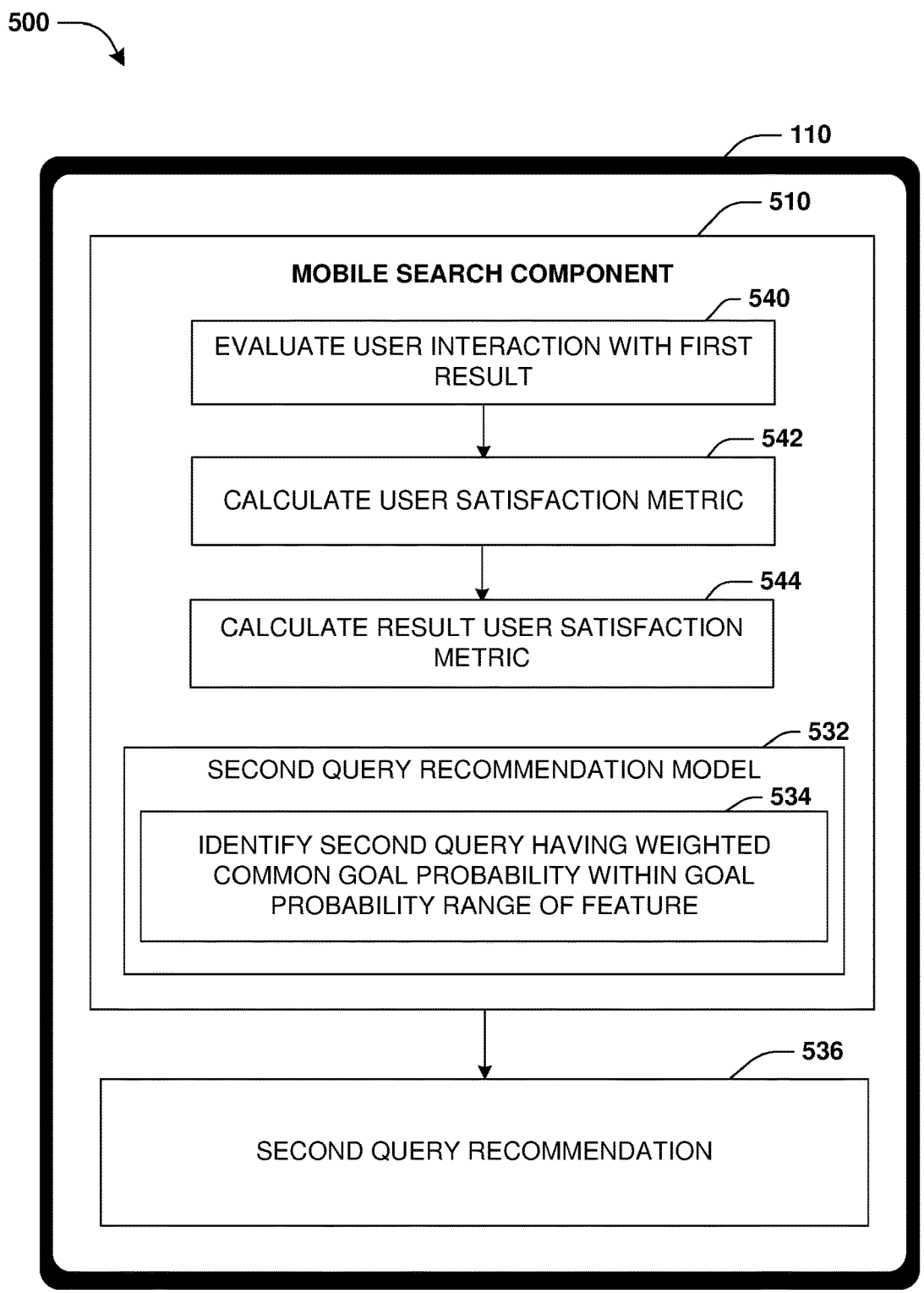
FIG. 5C is a component block diagram illustrating an example system for improving mobile searching, where a second query recommendation is generated.

FIG. 5C illustrates an evaluation of a user interaction 540 with the first result 519. The user interaction 540 may be evaluated, such as to calculate a user satisfaction metric 542. The user satisfaction metric 542 may be determined in same manner as described above in FIG. 4, with regard to the user satisfaction metric. A result user satisfaction metric 544 may be calculated in same manner as described above in FIG. 4, with regard to the user satisfaction metric, based upon the user interaction with the first result 519. In an example, responsive to the user selecting the first element 516, the result user satisfaction metric 542 associated with the search result ranking model 527 may be increased.

In an example, the result user satisfaction metric 544 may be determined based upon one or more reformulations, abandonments, DAGs, normalized DAGs, MRR, etc associated with the first result 519, the goal, and/or the mission. For example, a desired element (e.g., as identified by a user selecting the desired element after a reformulation, such as a link to a particular ticket vendor website) may be farther down on a page comprising the first result 519 or on a second page of the first result 519. Instead of scrolling down on the page and/or going to the second page to view the desired element of the ticket vendor website, the user may generate the reformulation. For example, responsive to the result user satisfaction metric 544 indicating that an increase in a rank of the desired element is desirable, the search result ranking model 527 may be tuned. In an example, a relatively higher abandonment rate and/or reformulation rate may be indicative of a lower user satisfaction metric. In an example, a relatively lower MAP, DAG, Normalized DAG, and/or MRR may be indicative of a lower user satisfaction metric.

In an example, responsive to the user performing additional searches, additional goals of the additional queries may be identified. In an example, additional interactions with additional results (e.g., generated from the additional queries) may be evaluated to determine a second user satisfaction metric for the additional searches. Additionally, the user interaction may comprise the user interacting with the query recommendation, the recommendation, etc. The user interaction may comprise the user selecting an element of the result, scrolling past elements of the result, leaving the results page, generating an additional query, selecting the recommendation, utilizing the query recommendation, or the like.

In an example, a second query recommendation 536 may be generated by a second query recommendation model 532 (e.g., trained utilizing the machine learning method trained utilizing the query-goal-mission structure). In an example, responsive to the second query recommendation model 532 presenting the second query recommendation 536, a second result 538 may be generated by the search results ranking model 527 (e.g., to identify a query recommendation model having a relatively higher query recommendation user satisfaction metric). The second query recommendation 536 may be identified based upon an identification of a second query 534. The second query 534 may have the weighted common goal similarity within the goal similarity range of the feature 511. In an example, the second query recommendation 536 may be presented to the user. In another example, a second recommendation may be generated by a second recommendation model. In an example, the second user satisfaction metric may comprise a second recommendation user satisfaction metric determined based upon a second user interaction with the second recommendation generated based upon the query 515. The second recommendation user satisfaction metric may be utilized to the tune the second recommendation model.

Figure 5D:
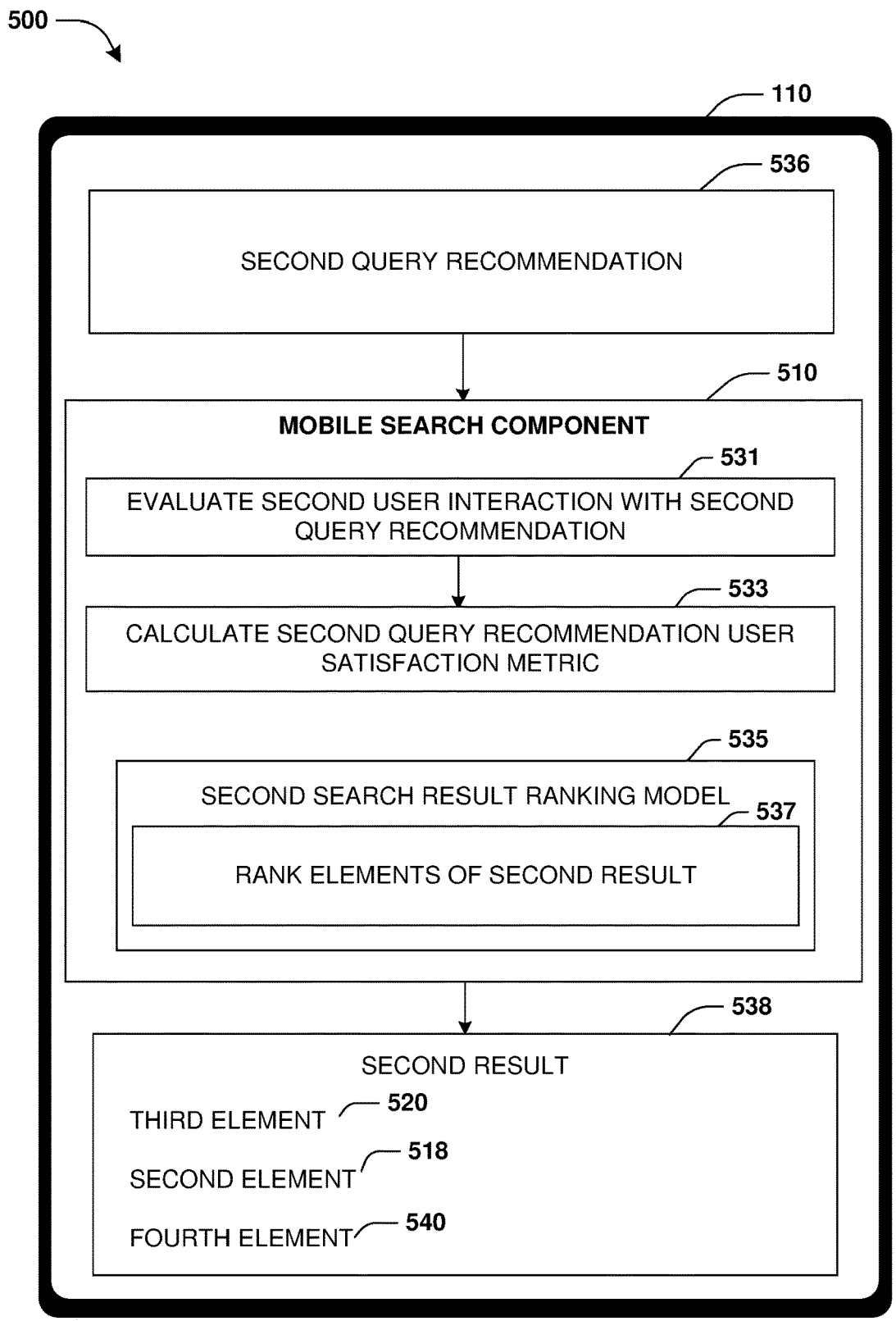
FIG. 5D is a component block diagram illustrating an example system for improving mobile searching, where a second result is generated

FIG. 5D illustrates an evaluation of a second user interaction 531 with the second query recommendation 536. Responsive to the user selecting the second query recommendation 536, the second user interaction 531 with the second query recommendation 536 may be evaluated. A second query recommendation user satisfaction metric 533 may be calculated based upon the second user interaction 531. A second search result ranking model 535 may rank elements 537 of the second result 538, corresponding to the second query recommendation 536 and/or the initial query 506. The second result 538 may be presented to the user. The second result 538 may comprise the third element 520, the second element 518, a fourth element 540, etc. In an example, responsive to the second search result ranking model 535 presenting the second result 538, the second query recommendation 536 may be generated by the query recommendation model 509 (e.g., to identify a search results ranking model having a relatively higher result user satisfaction metric).

Figure 5E:
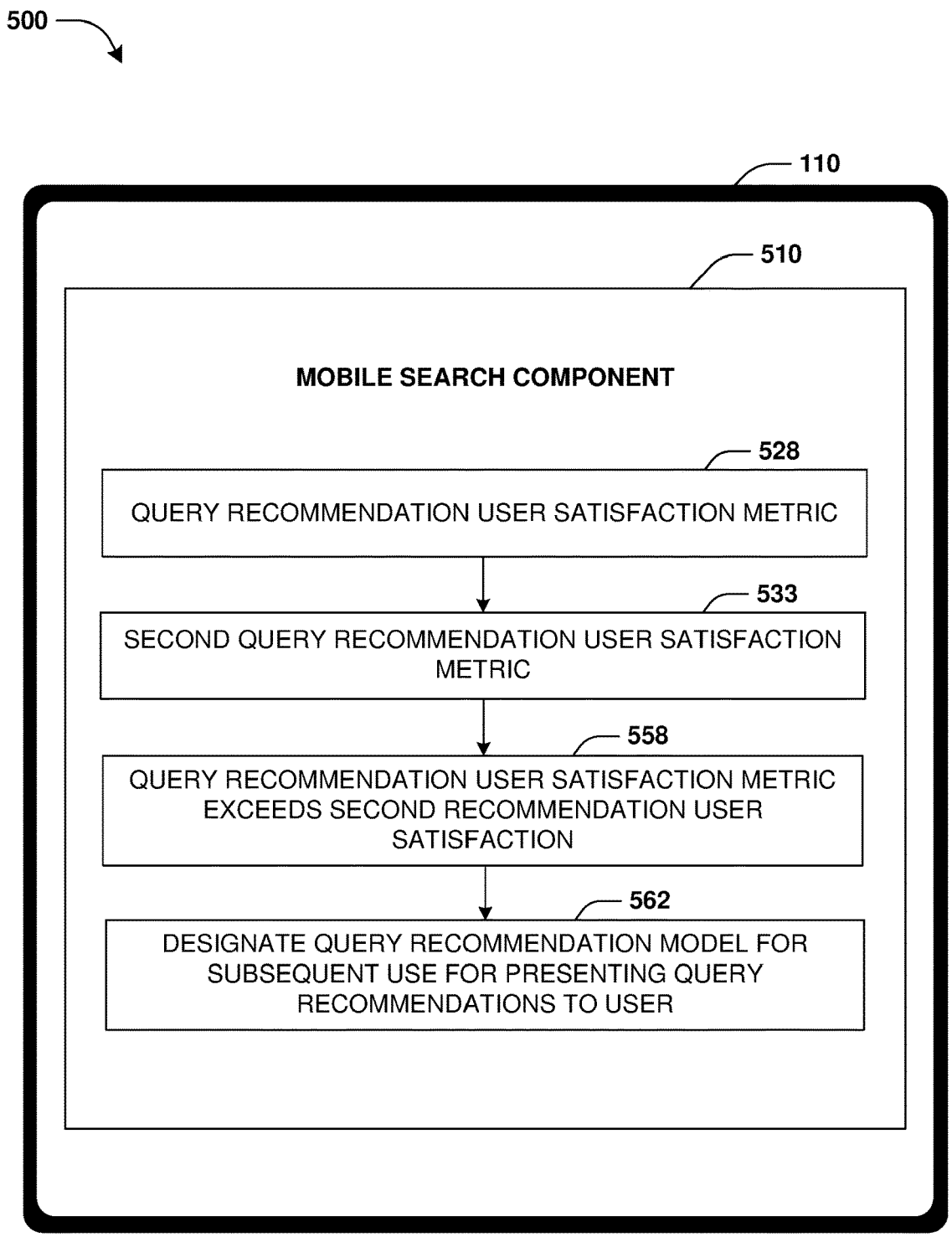
FIG. 5E is a component block diagram illustrating an example system for improving mobile searching, where a query recommendation model is designated for subsequent use for presentations of query recommendations to users.

FIG. 5E illustrates a designation of the query recommendation model 509 for presentation of subsequent query recommendations to users. In an example, responsive to the query recommendation user satisfaction metric 528 exceeding 558 the second query recommendation user satisfaction metric 533, the query recommendation model 509, but not the second query recommendation model 532, may be designated 562 for presenting subsequent query recommendations to users. In another example, the query recommendation user satisfaction metric 528 may be utilized to tune and/or train the query recommendation model 509. In an example, responsive to the recommendation user satisfaction metric exceeding the second recommendation user satisfaction metric, the recommendation model, but not the second recommendation model, may be designated for presenting subsequent recommendations to users.

Figure 5F:
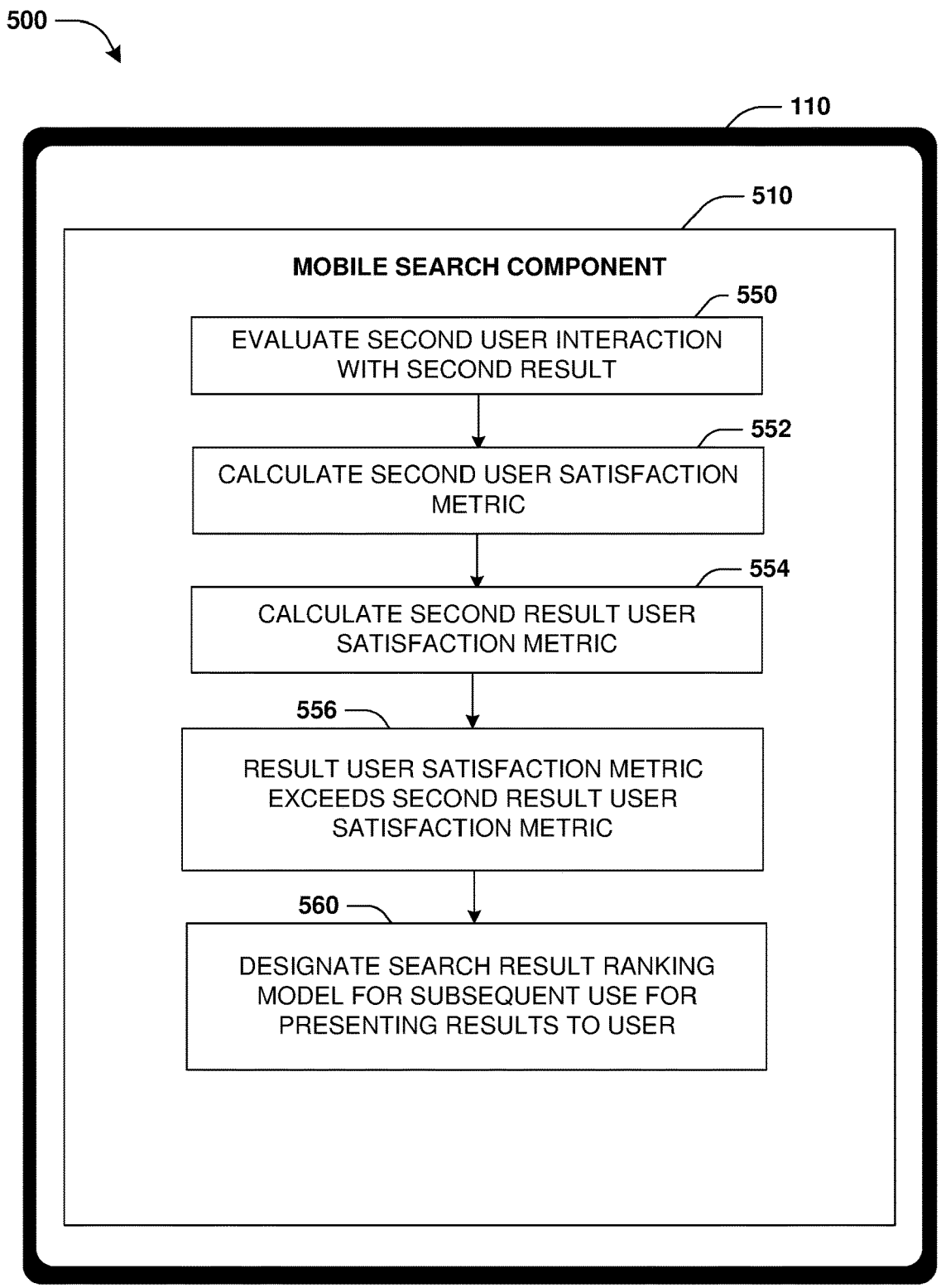
FIG. 5F is a component block diagram illustrating an example system for improving mobile searching, where a search result ranking model is designated for subsequent use for presentations of results to users.

FIG. 5F illustrates an evaluation of a second user interaction 550 with the second result 538. A second user satisfaction metric 552 may be determined in same manner as described above in FIG. 4, with regard to the user satisfaction metric. A second result user satisfaction metric 554 may be calculated in same manner as described above in FIG. 4, with regard to the user satisfaction metric, based upon the second user interaction 550 with the second result 538. In an example, responsive to the result user satisfaction metric 544 exceeding 556 the second result user satisfaction metric 554, the search result ranking model 527, but not the second search result ranking model 535, may be designated 560 for presenting subsequent element rankings of results to users. In another example, the result user satisfaction metric 544 may be utilized to tune and/or train the search result ranking model 527.

Figure 6A:
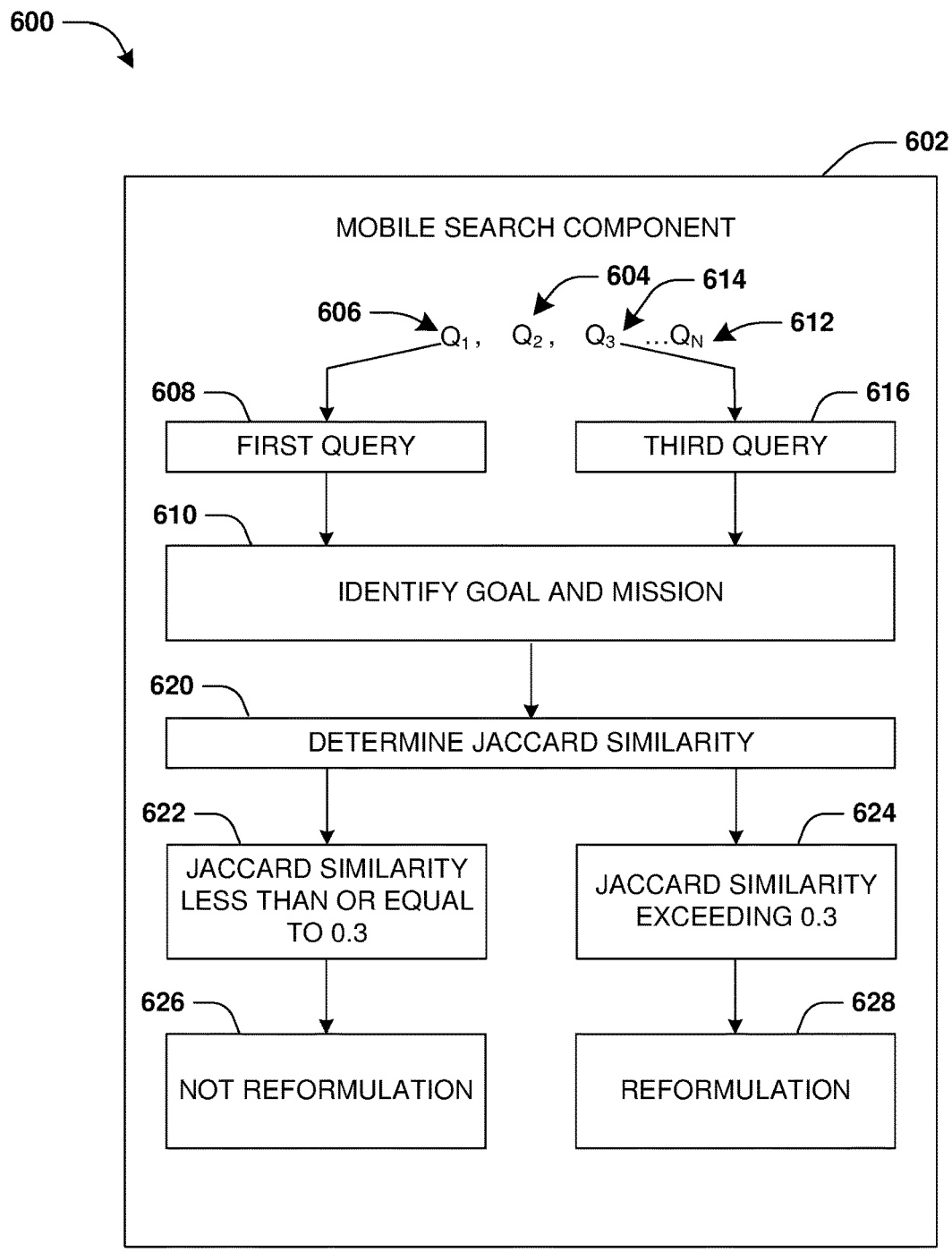
FIG. 6A is a component block diagram illustrating an example system for improving mobile searching, where a reformulation rate is determined.
Figure 6B:
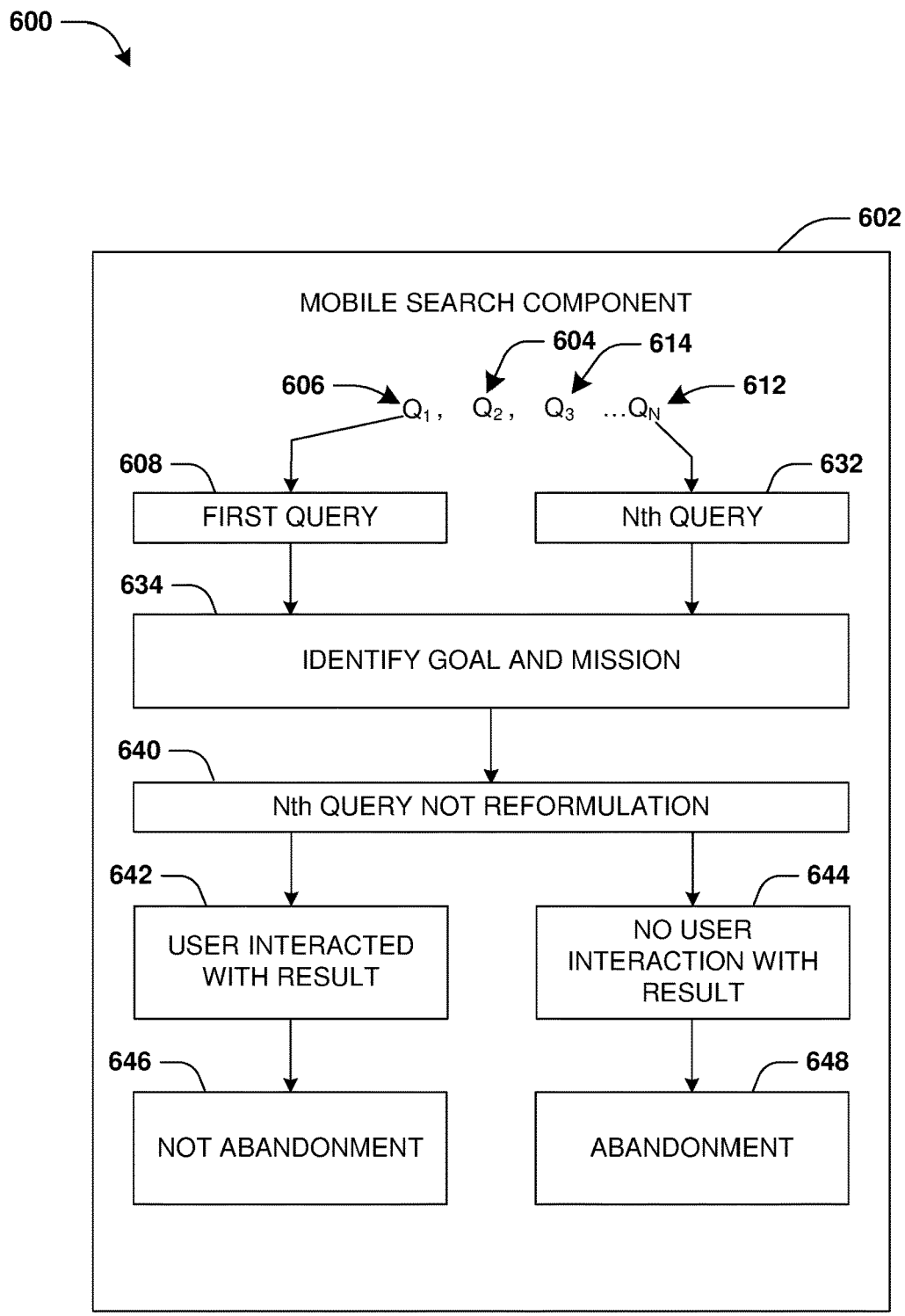
FIG. 6B is a component block diagram illustrating an example system for improving mobile searching, where an abandonment rate is determined.
Figure 6C:
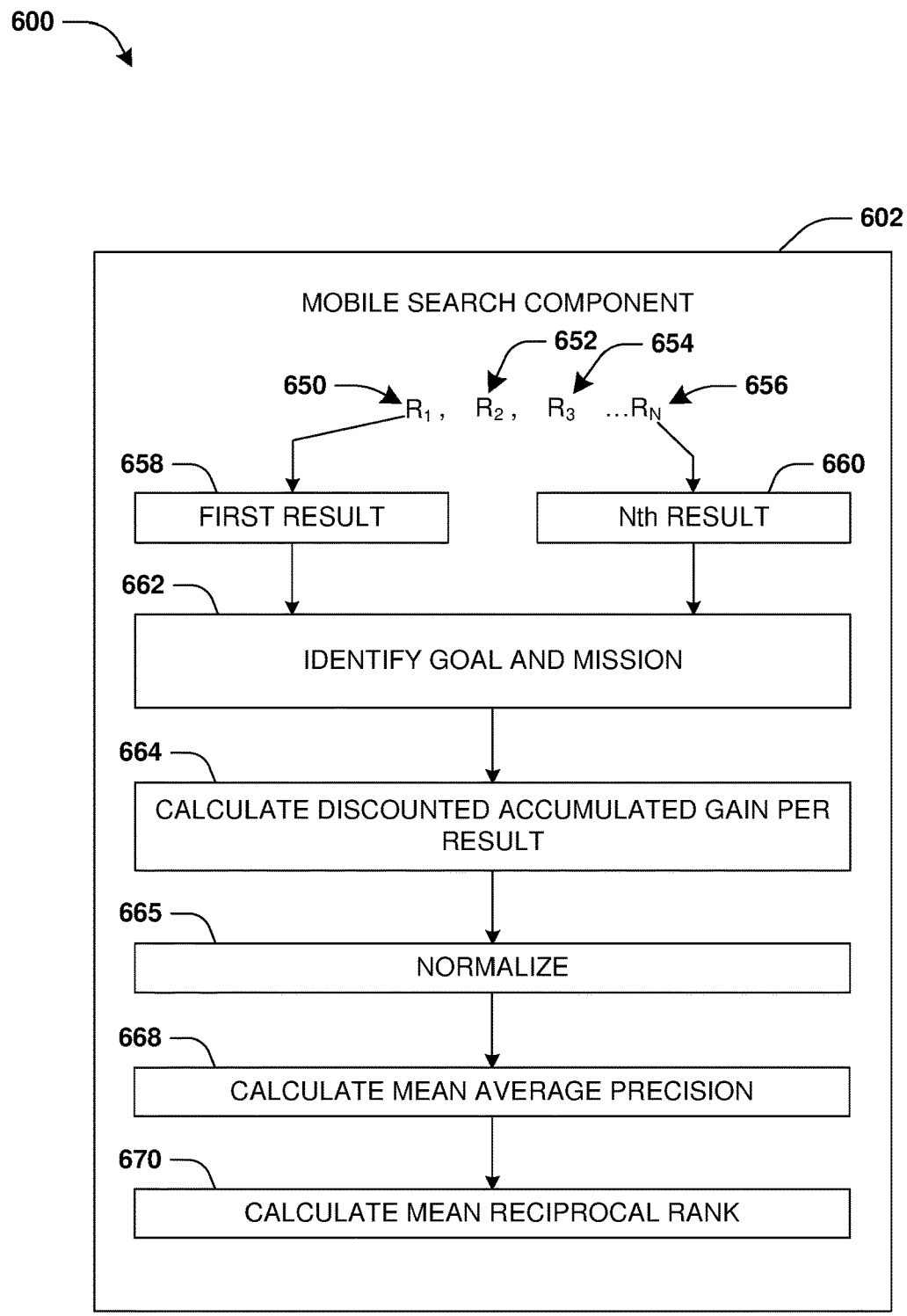
FIG. 6C is a component block diagram illustrating an example system for improving mobile searching, where user satisfaction metrics are determined.

FIGS. 6A-6C illustrate an example system 600 for identifying$_a$ reformulation 628 and/or an abandonment 648. A mobile search component 602 may identify a set of queries (e.g., a first query 608 $Q_1$ 606, a second query $Q_2$ 604, a third query 616 $Q_3$ 614, an Nth query 632 $Q_n$ 612, etc.) generated by the user. In an example, the queries may be generated on one or more client devices. The queries in the set of queries may be ordered in an order in which they were generated by the user. For example, the $Q_1$ 606 was generated first, the $Q_2$ 604 was generated second, etc. The mobile search component 602 may identify the first query 608, the third query 616, and the Nth query 632 as having a same goal and/or mission 610 (e.g., the first query 608 and the third query 616 are not a last query in the query set having the goal and/or mission 610). The mobile search component 602 may determine a Jaccard similarity 620 between the first query 608 and the third query 616. Responsive to the Jaccard similarity 620 being less than or equal to a threshold 622, the user altering the first query 608 to the third query 616 may be determined as not being a reformulation 626. Responsive to the Jaccard similarity 620 exceeding the threshold 624, the user altering the first query 608 to the third query 616 may be determined as the reformulation 628. In an example, if a fourth query (not shown) was determined to have the same goal and/or mission 610 as the first query 608 and the third query 616, then the mobile search component 602 may determine if the alteration from the first query 608 to the fourth query comprises a reformulation and/or if the alteration from the third query 616 to the fourth query comprises a reformulation. In an example, a telephone call, a textual message, and/or an interaction with a webpage may be treated in a same or similar manner as a query to identify a reformulation. For example, a recommendation for a first restaurant may be presented to a user. Responsive to calling the first restaurant on a phone and determining that the first restaurant does not meet the user's standards, the user may search for a second restaurant and may call the second restaurant, which may be identified as a reformulation.

FIG. 6B illustrates the example system 600 identifying the abandonment 648. The mobile search component 602 may identify the first query 608 and the Nth query 632 as comprising a same goal and/or mission 634. The mobile search component 602 may identify the Nth query 632 $Q_n$ 612 as a last query in the query set having the same goal and/or mission 634. The mobile search component 602 may determine (e.g., as described above in FIG. 6A) that the Nth query 632 does not comprise a reformulation 640. Responsive to the user interacting 642 with a result of the Nth query 632, the mobile search component 602 may determine that the Nth query 632 was not abandoned 464. Responsive to the user not interacting 644 with the result, the mobile search component 602 may determine that the Nth query 632 was abandoned 648. In an example, the telephone call, the textual message, and/or the interaction with the webpage may be treated in a same or similar manner as a query to identify an abandonment.

FIG. 6C illustrates the example system 600 identifying a discounted accumulated gain (DAG) 664, a normalized discounted accumulated gain (NDAG) 665, a mean average precision (MAP) 668, and/or a mean reciprocal rank (MRR) 670. The mobile search component 602 may identify a set of results (e.g., a first result 658 $R_1$ 650, a second result $R_2$ 652, a third result $R_3$ 654, an Nth result 660 $R_n$ 656, etc.) generated by the user. In an example, the results may be generated on one or more client devices. The mobile search component 602 may identify the first result 658, the third result $R_3$ 654, and the Nth result 660 as having a same goal and/or mission 662. The DAG 664 may be calculated for each of the first result 658, the third result $R_3$ 654, and the Nth result 660. The DAG 664 may be normalized to generate the NDAG 665 (e.g., because a result set size of the results may vary). In an example, a higher NDAG 665 may result in a higher user satisfaction score for the results and the associated model (e.g., such as a search result ranking model) that generated the results (e.g., based upon the goal and/or mission), and a lower NDAG 665 may result in a lower user satisfaction score for the results and the associated model.

The MAP 668 may be calculated for the first result 658, the third result $R_3$ 654, and the Nth result 660. The MAP 668 for the first result 658, the third result $R_3$ 654, and the Nth result 660 may be compared to results, having a common goal and/or mission, generated using a second model. In an example, a model having a highest and/or higher associated MAP 668 may be selected for subsequent presentation of results to users. The MRR 670 may be calculated for the first result 658, the third result $R_3$ 654, and the Nth result 660. In an example, a higher MRR 670 may result in a higher user satisfaction score for the first result 658, the third result $R_3$ 654, and the Nth result 660, and thus the associated model (e.g., such as the search result ranking model) that generated the results and/or ranked elements of the results, and a lower MRR 670 may result in a lower user satisfaction score for the results and the associated model.

Figure 7:
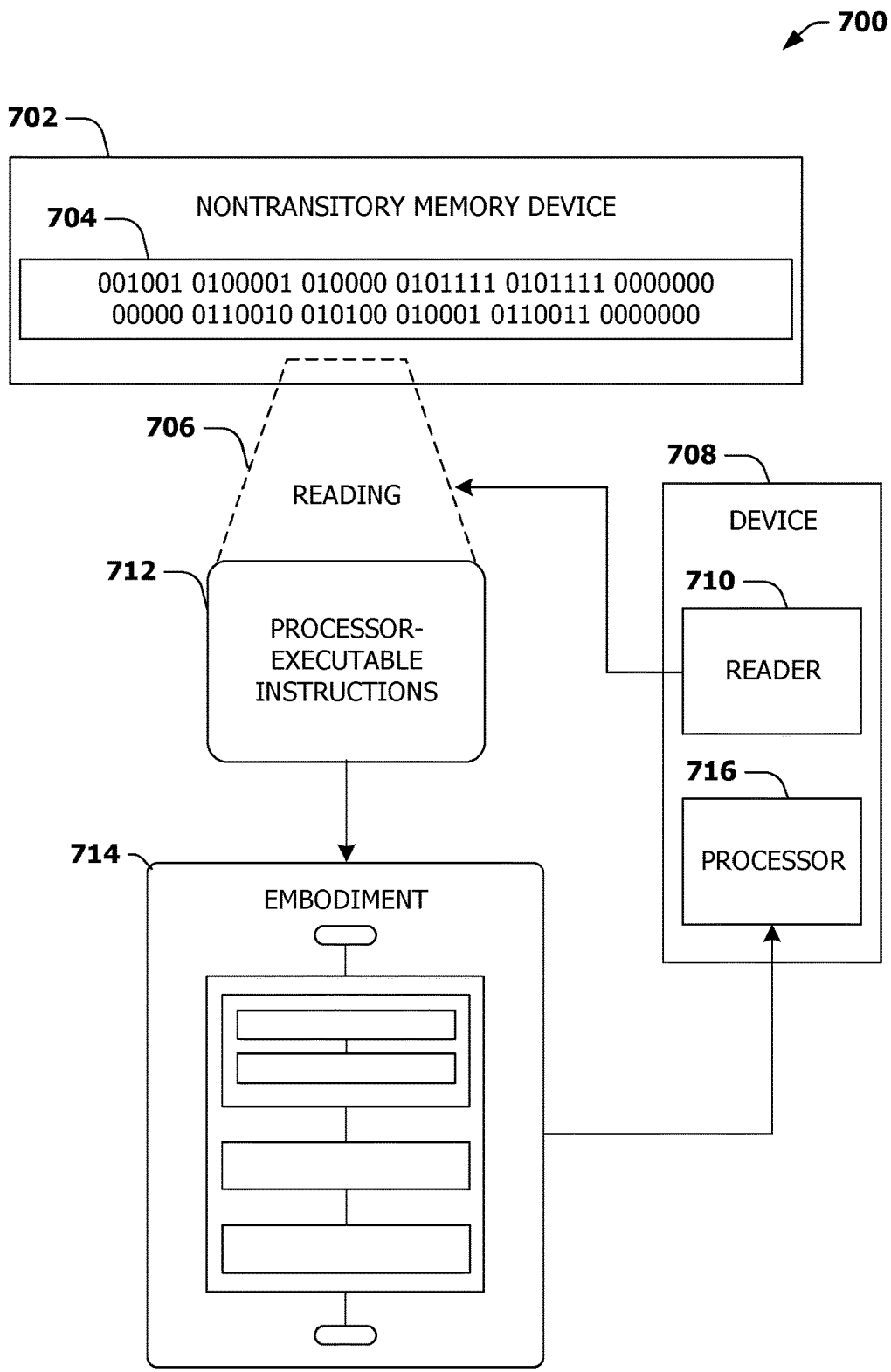
FIG. 7 is an illustration of a scenario featuring an example nontransitory memory device in accordance with one or more of the provisions set forth herein.

FIG. 7 is an illustration of a scenario 700 involving an example nontransitory memory device 702. The nontransitory memory device 702 may comprise instructions that when executed perform at least some of the provisions herein. The nontransitory memory device may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 702 stores computer-readable data 704 that, when subjected to reading 706 by a reader 710 of a device 708 (e.g., a read head of a hard disk drive, or a read operation invoked on a solid-state storage device), express processor-executable instructions 712. In some embodiments, the processor-executable instructions, when executed on a processor 716 of the device 708, are configured to perform a method, such as at least some of the example 400 of FIG. 4, for example. In some embodiments, the processor-executable instructions, when executed on the processor 716 of the device 708, are configured to implement a system, such as at least some of the example system 500 of FIGS. 5A-5F, and/or at least some of at least some of the example system 600 of FIGS. 6A-6C, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc.

For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for improving mobile searches, comprising:
   identifying a feature, generated by a user within a time period on a client device, based upon an identification of the user;
   evaluating the feature to identify a goal associated with the feature;
   assigning a goal identification to the feature;
   calculating a user satisfaction metric associated with the goal to determine a goal satisfaction metric based upon user interaction with results associated with the goal, the results generated by a first model generated utilizing a machine learning method based upon a query-goal-mission structure,
      the calculating a user satisfaction metric based upon at least one of a swipe rate through card modules associated with at least one of the goal or a mission, a number of card modules viewed associated with at least one of the goal or the mission, a card dismissal rate of the card modules associated with at least one of the goal or the mission, a number of card modules the user interacts associated with at least one of the goal or the mission, or an average scroll rate through the card modules associated with at least one of the goal or the mission;
   calculating a second user satisfaction metric associated with the goal to determine a second goal satisfaction metric based upon second user interaction with second results associated with the goal, the second results generated by a second model generated utilizing the machine learning method based upon the query-goal-mission structure; and
   responsive to the user satisfaction metric calculated based upon the user interaction with the results generated by the first model exceeding the second user satisfaction metric calculated based upon the second user interaction with the second results generated by the second model, selecting the first model that generated the results used to calculate the user satisfaction metric associated with the goal, but not the second model that generated the second results used to calculate the second user satisfaction metric associated with the goal, from amongst a plurality of models for subsequent use for presenting one or more results to users.

2. The method of claim 1, comprising:
   identifying a mission associated with the goal;
   assigning a mission identification to the feature;
   calculating the user satisfaction metric associated with the mission associated with the goal to determine a mission satisfaction metric based upon the user interaction with results associated with the mission associated with the goal, the results generated by the first model; and
   calculating the second user satisfaction metric associated with the mission associated with the goal to determine a second mission satisfaction metric based upon the second user interaction with results associated with the mission associated with the goal, the second results generated by the second model.

3. The method of claim 1, the calculating a user satisfaction metric comprising:
   determining at least one of a number of queries generated by the user associated with at least one of the goal or the mission, a number of clicks initiated by the user associated with at least one of the goal or the mission, a total time utilized by the user generating queries associated with at least one of the goal or the mission and viewing results of the queries, a normalized discounted accumulated gain for at least one of the goal or the mission, a discounted accumulated gain for at least one of the goal or the mission, a mean-average precision for at least one of the goal or the mission, or a mean reciprocal rank for at least one of the goal or the mission.

4. The method of claim 1, the calculating a user satisfaction metric comprising:
identifying a reformulation to calculate a reformulation rate.

5. The method of claim 4, the identifying a reformulation comprising:
identifying a second query, generated by the user, associated with at least one of the goal or the mission;
determining that a query and the second query are not a last query, in a query set associated with at least one of the goal or the mission, generated by the user; and
determining that the query and the second query have Jaccard similarity greater than a threshold.

6. The method of claim 1, comprising:
tagging one or more features generated by the user with at least one of:
the goal identification comprising a goal history of the user; or
a mission identification comprising a mission history of the user.

7. The method of claim 1, the calculating a user satisfaction metric comprising:
identifying an abandonment to calculate an abandonment rate.

8. The method of claim 1, the calculating a user satisfaction metric based upon the swipe rate through the card modules associated with at least one of the goal or the mission.

9. The method of claim 1, the calculating a user satisfaction metric based upon
the number of card modules viewed associated with at least one of the goal or the mission.

10. The method of claim 1, the calculating a user satisfaction metric based upon the card dismissal rate of the card modules associated with at least one of the goal or the mission.

11. The method of claim 1, the calculating a user satisfaction metric based upon the number of card modules the user interacts associated with at least one of the goal or the mission.

12. The method of claim 1, the calculating a user satisfaction metric based upon the average scroll rate through the card modules associated with at least one of the goal or the mission.

13. A client device for improving mobile searches, the client device comprising:
a processor;
a display; and
a memory storing instructions that, when executed on the processor, provide a system comprising:
a mobile search component configured to:
identify a feature, generated by a user within a time period on at least one client device, based upon an identification of the user;
evaluate the feature to identify a goal associated with the feature;
identify a mission associated with the goal;
identify a second goal associated with the mission, the second goal having goal similarity within a similarity range of the goal;
identify a query associated with the second goal, the query having a weighted common goal similarity within a goal similarity range of the feature;
present a query recommendation, generated by a query recommendation model, comprising the query, to the user, the query recommendation model generated utilizing a machine learning method trained using a query-goal-mission structure;
calculate a query recommendation user satisfaction metric associated with the feature and the query recommendation based upon user interaction of the user with the query recommendation;
present a second query recommendation, generated by a second query recommendation model, comprising the query, to the user, the query recommendation model generated utilizing the machine learning method trained using the query-goal-mission structure;
calculate a second query recommendation user satisfaction metric associated with the feature and the second query recommendation based upon second user interaction of the user with the second query recommendation;
calculate a user satisfaction metric based upon at least one of a swipe rate through content associated with at least one of the goal, the second goal or the mission, a number of content items viewed associated with at least one of the goal, the second goal or the mission, a dismissal rate of the content associated with at least one of the goal, the second goal or the mission, a number of content items the user interacts associated with at least one of the goal, the second goal or the mission, or an average scroll rate through the content associated with at least one of the goal, the second goal or the mission; and
based upon the user satisfaction metric, the query recommendation user satisfaction metric and the second query recommendation user satisfaction metric, select the query recommendation model that generated the query recommendation used to calculate the query recommendation user satisfaction metric associated with the feature and the query recommendation, but not the second query recommendation model that generated the second query recommendation used to calculate the second query recommendation user satisfaction metric associated with the feature and the second query recommendation, from amongst a plurality of query recommendation models for subsequent use for presenting query recommendations to users.

14. The client device of claim 13, the mobile search component configured to:
evaluate a result presented to the user, for the query, comprising elements ranked by a search result ranking model, the search result ranking model generated utilizing the machine learning method trained using the query-goal-mission structure;
calculate a result user satisfaction metric associated with the result based upon user interaction of the user with the result;

evaluate a second result presented to the user, for the query, comprising elements ranked by a second search result ranking model, the second search result ranking model generated utilizing the machine learning method trained using the query-goal-mission structure;

calculate a second result user satisfaction metric associated with the second result based upon user interaction of the user with the second result; and responsive to the result user satisfaction metric exceeding the second result user satisfaction metric, select the search result ranking model, but not the second search result ranking model, for subsequent use for presenting results to users.

15. The client device of claim 14, the mobile search component configured to:

determine at least one of a number of queries generated by the user having at least one of the goal or the mission, a number of clicks initiated by the user associated with at least one of the goal or the mission, a total time utilized by the user generating queries, associated with at least one of the goal or the mission, and viewing results of the queries, a normalized discounted accumulated gain associated with at least one of the result or the second result, a discounted accumulated gain associated with at least one of the result or the second result, a mean-average precision associated at least one of the result or the second result, or a mean reciprocal rank associated at least one of the result or the second result to determine at least one of the result user satisfaction metric or the second result user satisfaction metric.

16. The client device of claim 13, the mobile search component configured to:

determine at least one of a normalized discounted accumulated gain for at least one of the goal or the mission, a discounted accumulated gain for at least one of the goal or the mission, a mean-average precision for at least one of the goal or the mission, or a mean reciprocal rank for at least one of the goal or the mission to determine at least one of the query recommendation user satisfaction metric or the second query recommendation user satisfaction metric.

17. The client device of claim 13, the mobile search component configured to:

identify a reformulation to calculate a reformulation rate, the user satisfaction metric corresponding to the reformulation rate.

18. The client device of claim 13, the mobile search component configured to:

identify an abandonment to calculate an abandonment rate, the user satisfaction metric corresponding to the abandonment rate.

19. The client device of claim 13, the feature comprising:

a user interaction with the client device, the user interaction comprising at least one of a telephone call, generating an initial query, a webpage interaction, or textual interaction.

20. A non-transitory computer readable medium comprising instructions which when executed perform a method for improving mobile searches, comprising:

identifying a feature, generated by a user within a time period on a client device, based upon an identification of the user;

evaluating the feature to identify a goal associated with the feature;

identifying a mission associated with the goal;

identifying a second goal associated with the mission, the second goal having goal similarity within a similarity range of the goal;

identifying a query associated with the second goal, the query having a weighted common goal similarity within a goal similarity range of the feature;

evaluating a result, presented to the user, for the query, comprising elements ranked by a search result ranking model, the search result ranking model generated utilizing a machine learning method trained using a query-goal-mission structure;

calculating a result user satisfaction metric associated with the result based upon user interaction of the user with the result;

evaluating a second result, presented to the user, for the query, comprising second elements ranked by a second search result ranking model, the second search result ranking model generated utilizing the machine learning method trained using the query-goal-mission structure;

calculating a second result user satisfaction metric associated with the second result based upon second user interaction of the user with the second result, the calculating a second result user satisfaction metric based upon at least one of a swipe rate through content associated with at least one of the goal, the second goal or the mission, a number of content items viewed associated with at least one of the goal, the second goal or the mission, a dismissal rate of the content associated with at least one of the goal, the second goal or the mission, a number of content items the user interacts associated with at least one of the goal, the second goal or the mission, or an average scroll rate through the content associated with at least one of the goal, the second goal or the mission; and responsive to the result user satisfaction metric exceeding the second result user satisfaction metric, selecting the search result ranking model that ranked the elements of the result used to calculate the result user satisfaction metric associated with the result, but not the second search result ranking model that ranked the second elements of the second result used to calculate the second result user satisfaction metric associated with the second result, from amongst a plurality of search result ranking models for subsequent use for presenting one or more results to users.

* * * * *